(12) United States Patent  (10) Patent No.: US 8,437,518 B2
Chan et al.  (45) Date of Patent: May 7, 2013

(54) REGISTRATION OF ELECTROANATOMICAL MAPPING POINTS TO CORRESPONDING IMAGE DATA

(75) Inventors: Raymond Chan, San Diego, CA (US); Robert Manzke, Cambridge, MA (US); Zachary John Malchano, San Francisco, CA (US); Vivek Reddy, Boston, MA (US)

(73) Assignees: Koninklijke Philips Electronics N.V., Eindhoven (NL); The General Hospital Corporation, Boston, MA (US)

( * ) Notice: Subject to any disclaimer, the term of this patent is extended or adjusted under 35 U.S.C. 154(b) by 899 days.

(21) Appl. No.: 12/376,130

(22) PCT Filed: Aug. 6, 2007

(86) PCT No.: PCT/IB2007/053079
§ 371 (c)(1),
(2), (4) Date: Aug. 27, 2009

(87) PCT Pub. No.: WO2008/017999
PCT Pub. Date: Feb. 14, 2008

(65) Prior Publication Data
US 2010/0067755 A1   Mar. 18, 2010

Related U.S. Application Data

(60) Provisional application No. 60/821,728, filed on Aug. 8, 2006.

(51) Int. Cl.
*G06K 9/00* (2006.01)

(52) U.S. Cl.
USPC .......... 382/128; 382/129; 382/130; 382/131; 382/168; 382/171; 382/285; 382/294

(58) Field of Classification Search .......... 382/128–131, 382/294, 168, 171, 285
See application file for complete search history.

(56) References Cited

U.S. PATENT DOCUMENTS

| | | | |
|---|---|---|---|
| 5,450,846 A | 9/1995 | Goldreyer | |
| 5,647,360 A * | 7/1997 | Bani-Hashemi et al. | 600/425 |
| 6,611,615 B1 * | 8/2003 | Christensen | 382/130 |
| 7,397,934 B2 * | 7/2008 | Bloch et al. | 382/128 |
| 2004/0152974 A1 | 8/2004 | Solomon | |

(Continued)

FOREIGN PATENT DOCUMENTS

| WO | WO2005020147 A1 | 3/2005 |
|---|---|---|
| WO | WO 2005020147 A1 * | 3/2005 |

OTHER PUBLICATIONS

Integration—manipulation, Reddy et al., ISSN 0735-1097,vol. 44. No. 11, 2004., pp. 2202-2213.*

(Continued)

*Primary Examiner* — Jayesh A Patel

(57) ABSTRACT

A method for identifying a structure in a volume of interest is provided. The method comprises acquiring a plurality of points related to the structure in a continuous mode, and subsequently registering at least one of the points to a previously acquired imaging dataset of the structure. An apparatus, system and a computer-readable medium are also provided. The present invention provides faster acquisition of EAM points by modifying the mapping system so that catheter tip locations are automatically and continuously recorded without requiring explicit navigation to and annotation of fiducial landmarks on the endocardium.

12 Claims, 4 Drawing Sheets

U.S. PATENT DOCUMENTS

| | | | |
|---|---|---|---|
| 2004/0254437 | A1 | 12/2004 | Hauck et al. |
| 2005/0031176 | A1* | 2/2005 | Hertel et al. ............... 382/128 |
| 2006/0015096 | A1 | 1/2006 | Hauck et al. |
| 2006/0159323 | A1* | 7/2006 | Sun et al. ............... 382/128 |
| 2007/0223794 | A1* | 9/2007 | Preiss et al. ............... 382/128 |
| 2008/0170770 | A1* | 7/2008 | Suri et al. ............... 382/128 |

OTHER PUBLICATIONS

The impact—intervention., Noseworthy et al., 1547-5271, Heart rhythm society, 2005, pp. 1173-1178.*

Vivek Y. Reddy et al, "Integration of Cardiac Magnetic Resonance Imaging With Three-Dimensional Electroanatomic Mapping to Guide Left Ventricular Catheter Manipulation Feasibility in a Porcine Model of Healed Myocardial Infarction", Journal of American College of Cardiology, vol. 44, No. 11, 2004, pp. 2202-2213.

Peter A. Noseworthy et al, "The Impact of Respiration on Left Atrial and Pulmonary Venous Anatomy: Implications for Image-Guided Intervention", Heart Rhythm Society, vol. 2, 2005, pp. 1173-1178.

Frederik Maes et al, "Comparative Evaluation of Multiresolution Optimization Strategies for Multimodality Image Registration by Maximization of Mutual Information", Medical Image Analysis, vol. 3, No. 4, 1999, pp. 373-386.

Lishui Cheng et al, "A Generalized Level Set Formulation of the Mumford-Shah Functional with Shape Prior for Medical Image Segmentation", CVBIA 2005, LNCS 3765, pp. 62-71.

Frederik Maes et al, "Multimodality Image Registration by Maximization of Mutual Information", IEEE vol. 16, No. 2, Apr. 1997, pp. 187-198.

* cited by examiner

REGISTRATION OF ELECTROANATOMICAL MAPPING POINTS TO CORRESPONDING IMAGE DATA

FIELD OF THE INVENTION

This invention pertains in general to the field of medical imaging. More particularly the invention relates to registration of electroanatomical mapping points to a pre-acquired imaging dataset.

BACKGROUND OF THE INVENTION

Image-guided therapy for cardiovascular applications involves the integration of pre-acquired volumetric imaging data, such as 3D imaging data, e.g. obtained from MRI, CT, Ultrasound, or Fluoroscopic Imaging, with intra-procedural electroanatomical mapping information (EAM), which can be localized by magnetic fields, electrical fields, or ultrasound technology. This strategy is dependent on properly aligning the two datasets, which is a process commonly known as registration.

Existing methods for registration of the EAM and imaging data are based on a point-to-surface distance minimization algorithm (e.g. an iterated closest points algorithm, ICP). This approach requires the specific selection of points on the endocardial surface during the mapping procedure, followed by point-to-surface registration of those EAM points with chamber surface boundaries segmented from the imaging dataset.

The conventional scheme for point acquisition and subsequent point-to-surface registration is skill-dependent, time-consuming, and labor-intensive since the mapping catheter tip must first be manipulated to a landmark on the endocardium and then the tip location must be explicitly annotated within the EAM data record. This process of individual landmark identification and annotation must be repeated between 50-100 times to define the endocardial surface with sufficient detail for ICP-based registration to function accurately. To achieve this, 15-45 minutes of mapping just for the registration procedure may be necessary before the clinical or diagnostic or therapeutic component of the patient study begins. It is important to realize that any acquired EAM point location that is not in contact with the chamber surface adversely impact the quality of registration with point-to-surface distance minimization.

Hence, an improved method for point acquisition would be advantageous allowing for increased flexibility, cost-effectiveness, and timesavings.

SUMMARY OF THE INVENTION

Accordingly, the present invention preferably seeks to mitigate, alleviate or eliminate one or more of the above-identified deficiencies in the art and disadvantages singly or in any combination and solves at least the above-mentioned problems by providing a method, apparatus, system and a computer-readable medium according to the appended patent claims.

In one aspect of the invention a method for identifying a structure in a volume of interest is provided. The method comprises acquiring a plurality of points related to the structure in a continuous mode, and subsequently registering at least one of the points to a previously acquired imaging dataset of the structure.

In another aspect of the invention an apparatus for identifying a structure in a volume of interest is provided. The apparatus comprises an acquisition hardware for acquiring a plurality of points related to the structure in a continuous mode, and a registration hardware for subsequently registering each of the data points to an imaging dataset of the structure.

In another aspect of the invention a medical imaging system comprising the apparatus according to the above aspect of the invention is provided.

In a further aspect of the invention a computer-readable medium having embodied thereon a computer program for processing by a computer for identifying a structure in a volume of interest is provided. The computer program comprises an acquisition code segment for acquiring a plurality of points related to the structure in a continuous mode, and a registration code segment for registering at least one of the points to a previously acquired imaging dataset of the structure.

In yet another aspect of the invention a method for identifying an anatomical structure in a volume of interest is provided. The method comprises acquiring a plurality of points related to the anatomical structure in a continuous mode, and subsequently registering at least one of the points to a pre-procedurally or post-procedurally acquired imaging dataset of the structure.

The present invention provides faster acquisition of EAM points by modifying the mapping system so that catheter tip locations are automatically and continuously recorded without requiring explicit navigation to, as well as annotation of fiducial landmarks on the endocardium.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

Figure 1:
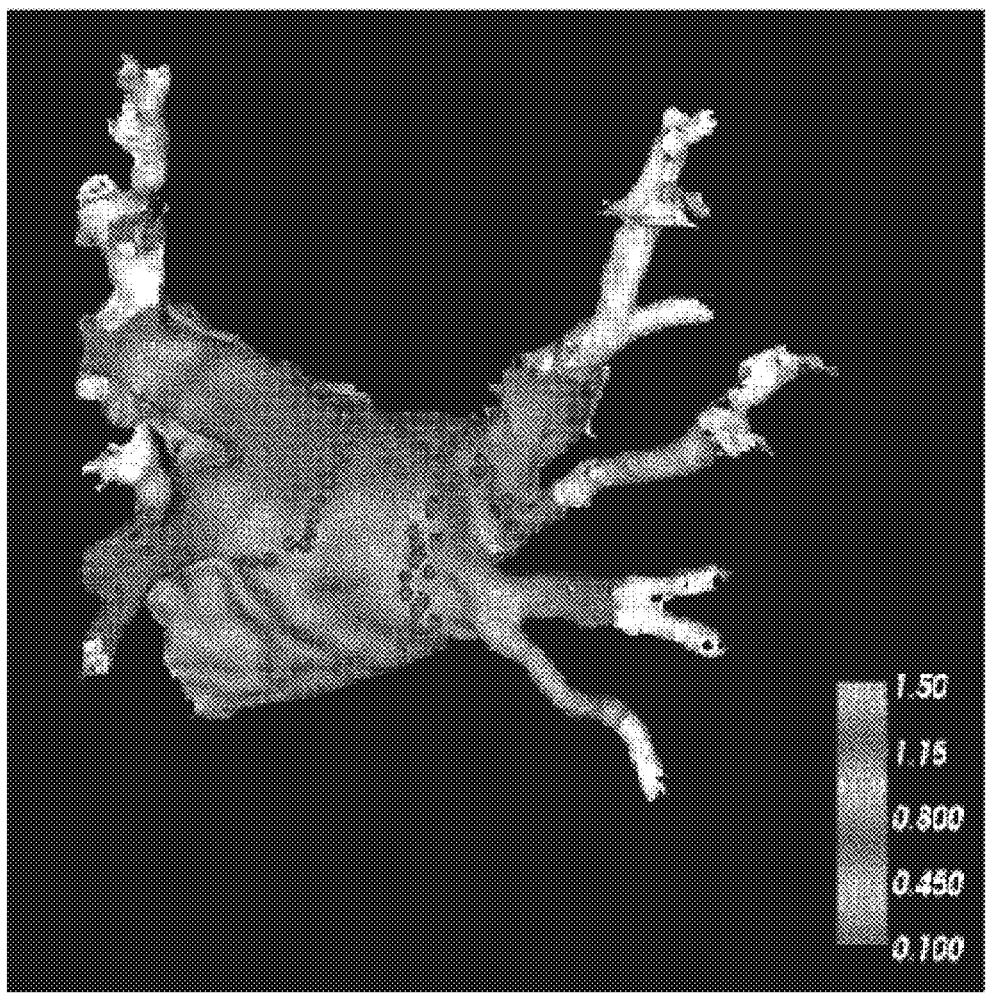
FIG. 1 is an illustration showing a conventional registration of EAM points to pre-acquired imaging data.

FIG. 1 illustrates a conventional registration of EAM points to pre-acquired imaging data that requires tedious catheter navigation and targeted point selection to identify surface points on the endocardium. These EAM points are registered and overlaid on a segmented cardiac surface model from preoperative imaging (shown as a shaded surface model).

The following description focuses on embodiments of the present invention applicable to medical imaging and in particular to registration of continuously acquired electroanatomical mapping points to an imaging dataset. However, it will be appreciated that the invention is not limited to this application but may be applied to any inter-operative procedure requiring rapid fusion of dispersed 3D point clouds (plurality of points) with multimodality volumetric imaging datasets for interventional guidance or diagnostics e.g. within a cardiac cath lab, EP lab, or image-guided surgical suite.

The present invention provides a point acquisition method, in which cardiovascular boundaries in the EAM dataset are not explicitly defined, so conventional point-to-surface distance minimization (e.g. ICP) methods cannot be used. That is, internal point locations distant from the endocardial surface would adversely impact the quality of registration.

Figure 2A:
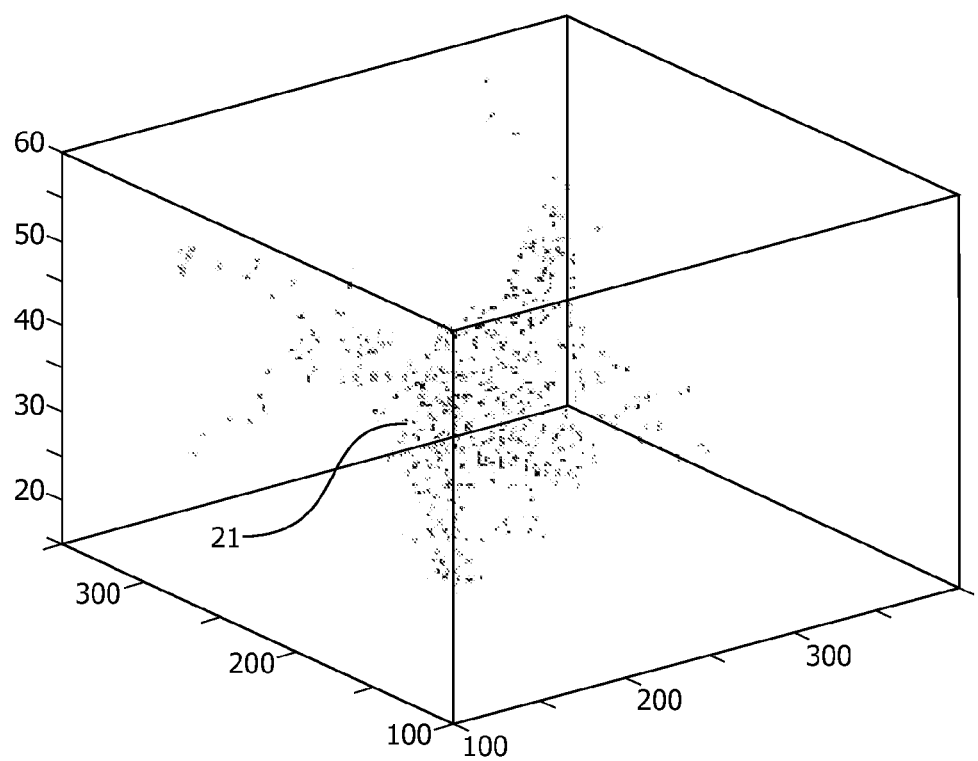
FIG. 2 illustrates a method for continuous point cloud (cluster) acquisition according to an embodiment.

In an embodiment of the present invention, according to FIG. 2a, a method for continuous point cloud (unorganized and untargeted point cluster) acquisition is provided, that departs from conventional point acquisition for image-guided mapping. The method obviates the need for specific navigation of a catheter tip(s) to the endocardial surface. The method provides for automatic acquisition of EAM locations (points) 21 that are recorded in a continuous fashion in either un-gated or gated (where temporal gating signals such as the ECG or the respiratory signal may be used as triggers to tag which EAM points should be included in the registration process) modes while the electrophysiologist/user manipulates a catheter with one or several position sensing elements throughout the cardiovascular structures of interest, such as a heart chamber.

By utilizing the method for continuous point cloud acquisition, a large number of points are acquired in a very short time period. For instance, if the points are acquired in an un-gated mode, approximately 10,000 points may be efficiently acquired within 5 minutes. Since the resulting volumetric point cloud consists of a widely dispersed locus of catheter tip positions, and is densely sampled it allows for good definition of the geometry of the cardiovascular structure of interest, sufficiently for registration with pre-operative imaging data.

In an embodiment of the present invention, a method for mapping of continuously acquired EAM point clouds to at least one imaging dataset is provided. The method may be summarized in two separate steps, wherein the first step comprises image processing the at least one imaging dataset. The second step includes aligning or performing registration of the continuously acquired point clouds to the processed at least one imaging dataset.

Figure 2B:
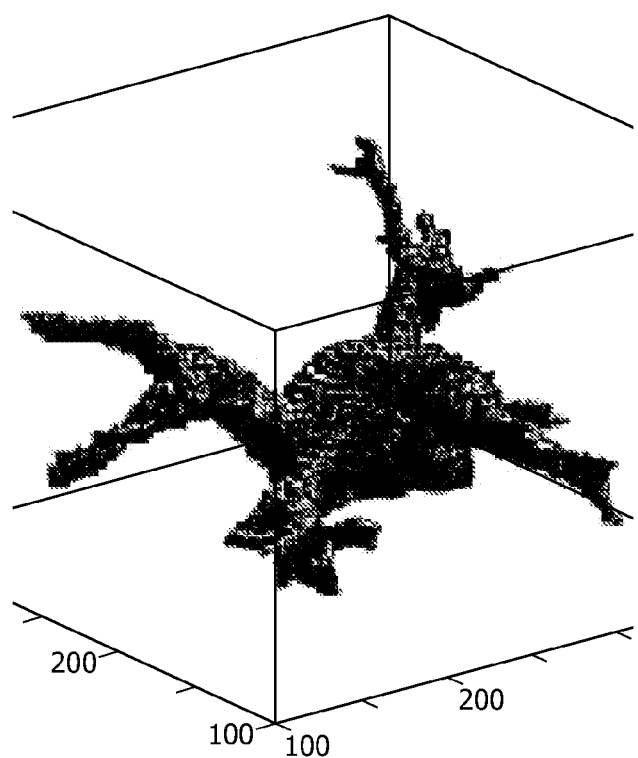

A result of utilizing the method for continuous point cloud acquisition with the method for mapping continuously acquired points to an imaging dataset is shown in FIG. 2b, in which the continuously acquired points are aligned to the pre-procedurally or post-procedurally acquired imaging dataset.

In an embodiment a method for identifying a structure in a volume of interest is provided. The method comprises acquiring a plurality of points related to the structure in a continuous mode, and subsequently registering at least one of the points to a previously acquired imaging dataset of the structure.

Figure 3:
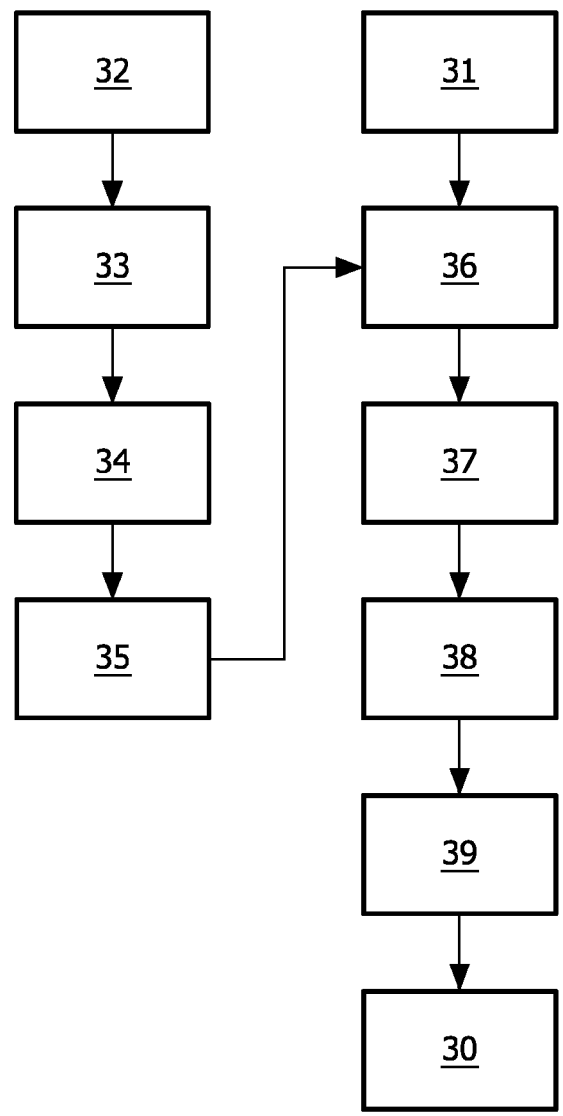
FIG. 3 is an illustration showing a method according to an embodiment.

In an embodiment, according to FIG. 3, the registering comprises, processing 33 the imaging dataset by segmentation, to locate the structure in the volume of interest in the imaging dataset, resulting in segmented surfaces constituting the structure. Moreover the registering comprises calculating 34 3D binary masks based on the segmented surfaces by defining the voxels lying inside the structure surface to have a non-zero mask value, such as value 1, while assigning voxels outside the structure surface a mask value of zero.

Furthermore the registering comprises computing 35 3D distance function or other computed metric which reflects a distance to the structure surface of interest from the 3D binary masks. The overall goal of the steps 33-35 is to extract from the imaging volume, 3D distance measures which may be used in the following steps to determine how closely registered the plurality of points are to the structure in the volume of interest of the imaging dataset.

The registering moreover comprises initializing 36 an alignment of the continuously acquired plurality of points with the imaging dataset by using a table transformation derived from known coordinate system orientations, such as of pre-procedural MR/CT and the electroanatomical mapping system (i.e. CARTO). Furthermore the registering comprises iteratively estimating 37 the unknown registration parameters to update the plurality of points with respect to the imaging dataset. As an example, given a set of estimated parameter values, spatial transformation of the plurality of points with respect to the imaging dataset may be performed by multiplying the transform matrix with the 3D point coordinates.

The registering moreover comprises comparing 38 each point with the corresponding value from the distance function, resulting in calculating 39 a value of an objective function depending on the estimated registration parameters. In an embodiment the distance function value computed at each point in step 38 is summed for all points, resulting in an objective function value corresponding to the current registration transform estimate. Furthermore the registering comprises minimizing the objective function by iteratively updating the estimated registration parameters 30, e.g. by conjugate-gradient-based function minimization, until the estimated registration parameters change by less than a predetermined tolerance.

In an embodiment the plurality of points are electroanatomical mapping points.

In an embodiment the at least one imaging dataset is a pre-procedurally acquired imaging dataset.

In an embodiment the at least one imaging dataset is post-procedurally acquired after the plurality of points are continuously acquired.

In an embodiment the at least one imaging dataset is acquired before the continuous plurality of points acquisition.

In an embodiment the structure in the volume of interest of the imaging dataset is a cardiac structure.

In an embodiment the image processing of the at least one imaging dataset includes segmentation and masking, i.e. computing 3D binary masks by using at least one segmentation tool, which may be any of a variety of segmentation tools, such as algorithms for deformable surfaces, level-set segmentation methods, connected components region growing, etc, typically available on imaging workstations (e.g. the Siemens Syngo or Philips Brilliance workstations) or within image analysis software (e.g. Analyze, MATLAB, Insight Registration/Segmentation Toolkit). The processing further comprises computing a 3D distance function based on the masks, so that the distance value is zero for all pixels within the segmented chamber, whereas for each pixel outside the chamber, the distance value is the distance to the closest boundary point on the segmented surface from the imaging dataset.

In an embodiment, the segmentation comprises using a deformable surface based on regularized region-based evolution of a shape-constrained surface model to the imaging dataset.

In an embodiment, the registration step includes crudely aligning the continuously acquired point clouds with the processed imaging dataset (e.g. pre-acquired CT/MR volume data or intraoperatively-acquired CT-like reconstruction from 3D Rotational Angiography, 3DRA) frame of reference by shifting the centroid of the point cloud to match that of the 3D binary mask. Next, an initial estimate for the unknown rigid-body transformation parameters, e.g. starting with an approximate table transformation which maps the EAM coordinate system with that from the MR or CT imaging system is used to update the EAM point cloud position with respect to the imaging volume. The current location of each point within the EAM point cloud is then used to lookup the corresponding value from the distance function and the distance value over all points within the cloud is summed to compute the value of an objective function, which depends on the unknown registration parameters, which in 3D, corresponds to three unknown translation parameters in X/Y/Z and to three unknown rotational angles around the X/Y/Z axes. Next, the objective function is minimized by, e.g. conjugate-gradient-based methods for function minimization, by iteratively updating the parameter estimates for the unknown rigid-based transformation between the EAM point cloud and the processed imaging dataset. A predetermined threshold value, e.g. motion of <0.1 mm, defines when the iterations are considered to have converged. The final registration parameters represent the estimated transformation between EAM and the imaging system coordinate systems.

In an embodiment the at least one imaging dataset is an intra operatively acquired imaging dataset.

In an embodiment the processing step and calculating step does not include segmentation and 3D binary mask generation. In this case the method is starting at step 31, as shown in FIG. 3, instead of starting at step 32. This may be the case of imaging datasets for which the cardiovascular chambers have relatively uniform intensity values, such as for contrast-enhanced X-ray/CT imaging datasets or for dark-blood/bright-blood MRI pulse sequences. If no segmentation is necessary the overall time of the processing step is reduced, which is a great advantage in some embodiments. However, in some cases, the alignment accuracy of the plurality of points is reduced when no segmentation is performed. Hence, in some embodiments segmentation is preferred and in some embodiments no segmentation is preferred. The segmentation-free embodiment is advantageous since a separate segmentation step is not required and leads to more rapid clinical workflow. In procedures where volume visualization of the pre-procedural imaging data is sufficient for use with electroanatomical mapping, the segmentation-free approach may by utilized.

In other embodiments wherein the segmented surface model is used, the segmentation approach is the preferred embodiment. In an embodiment the registration step comprises crudely aligning the continuously acquired point clouds based on a known table transformation, which maps the EAM coordinate system to the imaging coordinate system. Next, the point positions are used to sample the image intensity values at the corresponding locations within the volumetric imaging dataset. The distribution of intensity values at all point locations provides an intensity histogram that may be used to perform transformation parameter estimation. In the case of uniformly enhanced cardiovascular chambers, the intensity histogram will exhibit a relatively tight distribution around the average intensity value. For a poor registration estimate, the intensity histogram will exhibit greater dispersion arising from points being sampled from voxels lying outside the cardiovascular structures of interest.

According to an embodiment, a measure such as the standard deviation or entropy derived from the histogram is used, allowing to iterate over transformation parameters estimates so as to maximize the similarity of voxel intensity values sampled over all points in the 3D point cloud. The final registration transformation estimates will therefore have been derived without any need for segmentation.

Figure 4:
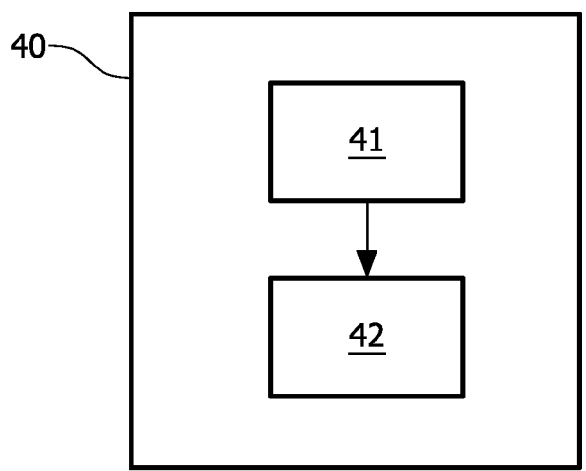
FIG. 4 is an illustration showing an apparatus according to an embodiment.

In an embodiment, according to FIG. 4, an apparatus 40 for identifying a structure in a volume of interest is provided. The apparatus comprises an acquisition hardware 41 for acquiring a plurality of points related to the structure in a continuous mode, and a registration hardware 42 for subsequently registering each of the data points to an imaging dataset of the structure.

Figure 5:
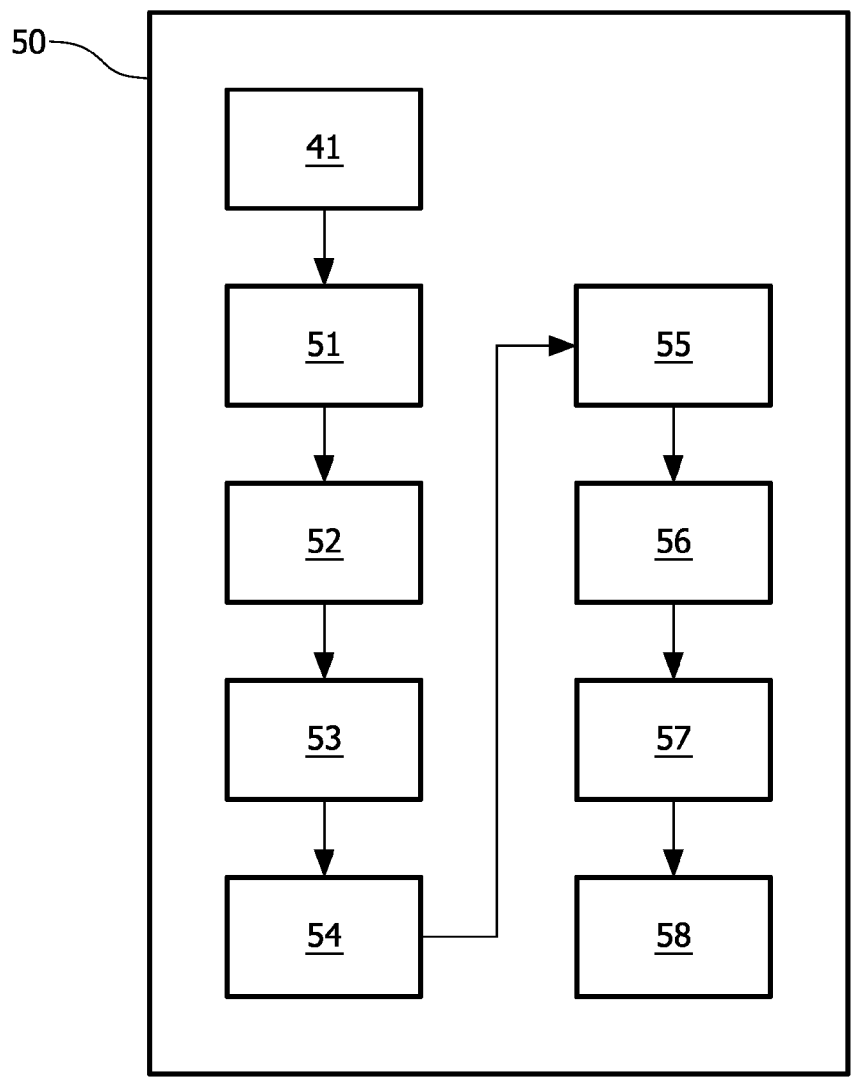
FIG. 5 is an illustration showing an apparatus according to an embodiment.

In an embodiment of the present invention, according to FIG. 5, the registration hardware further comprises a processing hardware 51 for processing the imaging dataset by segmentation. The apparatus further comprises a first calculating hardware 52 for calculating 3D binary masks, and a second calculating hardware 53 for calculating a distance function or other computed metric that reflects a distance to the structure surface—of interest. Moreover, the apparatus comprises an aligning hardware 54 for aligning the continuously acquired plurality of points with the imaging dataset, and an estimating hardware 55 for estimating registration parameters to update the plurality of points with respect to the imaging dataset. Furthermore, the apparatus comprises a comparing hardware 56 for comparing each point with the corresponding value from the distance function, and a third calculating hardware 57 for calculating a value of an objective function depending on the estimated registration parameters, and a minimizing hardware 58 for minimizing the objective function by iteratively updating the estimated registration parameters by conjugate-gradient-based function minimization until the estimated registration parameters change by less than a predetermined tolerance.

In an embodiment of the invention the registration hardware is capable of performing the method according to some embodiments.

In some embodiments the acquisition hardware of the apparatus comprises a processor and a memory. The processor is capable of initiating an acquisition of plurality of points, and to save the plurality of points on the memory. Different processors and memories may be used for the acquisition process.

In some embodiments the registration hardware of the apparatus comprises a processor and a memory. The processor is capable of performing the registration procedure while the memory is used for storage. Different processors and memories for different steps of the registration procedure may be used. The memory may be integrated in the processor, such as an internal processor memory.

The processor could be any of variety of processors, such as Intel or AMD processors, CPUs, microprocessors, Programmable Intelligent Computer (PIC) microcontrollers, Digital Signal Processors (DSP), etc. However, the scope of the invention is not limited to these specific processors.

The memory may be any memory capable of storing point information, such as Random Access Memories (RAM) such as, Double Density RAM (DDR, DDR2), Single Density RAM (SDRAM), Static RAM (SRAM), Dynamic RAM (DRAM), Video RAM (VRAM), etc. The memory may also be a FLASH memory such as a USB, Compact Flash, SmartMedia, MMC memory, MemoryStick, SD Card, MiniSD, MicroSD, xD Card, TransFlash, and MicroDrive memory etc. However, the scope of the invention is not limited to these specific memories.

The memory and optionally the processor internal memory may comprise software for performing acquisition and registration of plurality of points.

In an embodiment the acquisition hardware further comprises a catheter capable of continuous point acquisition of a volume of interest by using suitable sensing elements on the catheter. The catheter may have multiple separate sensing elements to further accelerate the point acquisition process.

Several currently available catheters for point acquisition may be used for continuous point acquisition, by being polled in a continuous fashion and transmit measurement data back to the controller software continuously.

In an embodiment the catheter utilizes electromagnetism for continuous electromagnetic sensing of point locations.

In an embodiment the catheter utilizes ultrasound for continuous ultrasound sensing of point locations.

In an embodiment the apparatus is a medical workstation.

In an embodiment a system comprising the apparatus is provided.

In an embodiment the system is a medical imaging system such as a CT system, MRI system, or ultrasound system.

Figure 6:
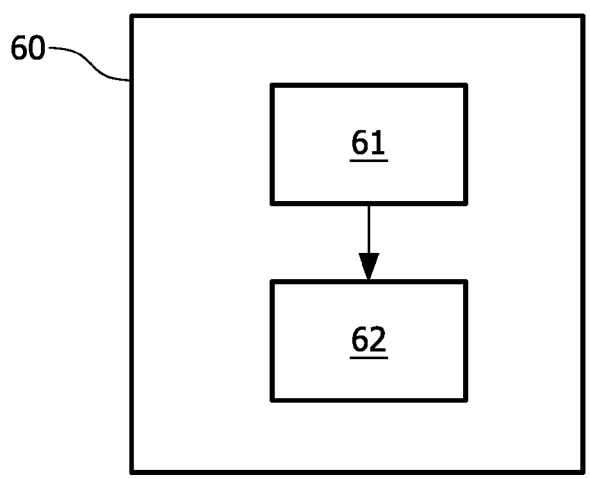
FIG. 6 is an illustration showing a computer readable medium according to an embodiment.

In an embodiment, according to FIG. 6, a computer-readable medium having embodied thereon a computer program 60 for processing by a computer is provided. The computer program comprises a code segment 61 for performing continuous EAM point cloud acquisition. The computer program 60 further comprises a registration code segment 62 for aligning the acquired continuous point clouds to at least one imaging dataset.

The computer may be any device comprising processing and storing capability, such as a processor and a memory (see description above).

In an embodiment the computer program has a code segment for performing the method according to an embodiment of the invention.

In a further embodiment the computer program comprises code segment (controller software) to control continuous point acquisition, e.g. performed by a catheter.

In an embodiment of the invention the computer program is comprised in the hardware of the apparatus according to some embodiments.

In an embodiment the volume of interest is any anatomical cavity enabling continuous acquisition of point clouds with a catheter.

In an embodiment the volume of interest is any non-anatomical cavity enabling continuous acquisition of point clouds with a catheter.

In a practical implementation of the invention, firstly a catheter is introduced into an organ, such as the heart of a patient. Data points describing the cavity of the organ are continuously acquired using the catheter. A CT or MRI imaging dataset of the organ is then processed and the acquired points of the organ cavity are aligned to the processed imaging dataset. After alignment an image-guided therapy of the heart may be initiated.

The invention may be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of hardware, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method for identifying a structure in a volume of interest, comprising acts of:
   acquiring a plurality of points related to said structure in a continuous mode, and subsequently
   registering at least one of said points to a previously acquired imaging dataset said structure;
   wherein said registering comprises acts of:
   processing said imaging dataset by segmentation,
   calculating 3D binary masks,
   calculating a distance function or other computed metric which reflects a distance to the surface of the structure of interest,
   aligning said continuously acquired plurality of points with said imaging dataset,
   estimating registration parameters to update the plurality of points with respect to said imaging dataset,
   comparing each point with the corresponding value from said distance function,
   calculating a value of an objective function depending on said estimated registration parameters,
   minimizing said objective function by iteratively updating said registration parameters by conjugate-gradient-based function minimization until said registration parameters change by less than a predetermined tolerance.

2. The method according to claim 1, wherein said segmentation comprises algorithms for deformable surfaces, level-set segmentation methods, or connected components region growing, or provided within image analysis software.

3. A method for identifying a structure in a volume of interest, comprising acts of:
   acquiring a plurality of points related to said structure in a continuous mode, and subsequently
   registering at least one of said points to a previously acquired imaging dataset of said structure,
   aligning the continuously acquired plurality of points based on a known table transformation mapping an EAM coordinate system to an imaging coordinate system sampling values derived from image intensity at the corresponding locations within said imaging dataset, based on said continuously acquired point positions, to obviate the need for segmentation
   providing an intensity histogram of the distribution of intensity or intensity-derived values at all point locations, and
   performing transformation parameter estimation based on said intensity histogram.

4. The method according to claim 3, comprising an act of using standard deviation and/or entropy derived from the histogram to iterate over transformation parameters estimates so as to maximize the similarity of voxel intensity values sampled over all points in the plurality of points.

5. An apparatus for identifying a structure in a volume of interest, the apparatus comprising:
   an acquisition hardware for acquiring a plurality of points related to said structure in a continuous mode, and a registration hardware for subsequently registering each of said data points to an imaging dataset of said structure;

wherein said registration hardware further comprises:

a processing hardware for processing said imaging dataset by segmentation, a first calculating hardware for calculating 3D binary masks, a second calculating hardware for calculating a distance function or other computed metric which reflects a distance to the structure surface of interest, an aligning hardware for aligning the continuously acquired plurality of points with said imaging dataset, an estimating hardware for estimating registration parameters to update the plurality of points with respect to said imaging dataset, a comparing hardware for comparing each point with the corresponding value from the distance function, a third calculating hardware for calculating a value of an objective function depending on said estimated registration parameters, and a minimizing hardware for minimizing the objective function by iteratively updating said estimated registration parameters by conjugate-gradient-based function minimization until said estimated registration parameters change by less than a predetermined tolerance.

6. The apparatus according to claim 5, wherein said plurality of points are electroanatomical mapping points and said imaging dataset is a pre-procedurally or post-procedurally acquired imaging data set.

7. The apparatus according to claim 6, wherein said acquisition hardware further comprises a catheter configured to use ultrasound or electromagnetism for point location acquisition.

8. The apparatus according to claim 5, wherein said apparatus is a medical workstation.

9. The apparatus according to claim 5, wherein the apparatus comprises a portion of a medical imaging system.

10. A non-transitory computer-readable medium having embodied thereon a computer program for processing by a computer for identifying a structure in a volume of interest, the computer program comprising:

an acquisition code segment for acquiring a plurality of points related to said structure in a continuous mode, and a registration code segment for registering at least one of said points to a previously acquired imaging dataset of said structure;

wherein said registration code segment is configured to:

process said imaging dataset by segmentation calculate 3D binary masks, calculate a distance function or other computed metric which reflects a distance to the surface of the structure of interest, align said continuously acquired plurality of points with said imaging dataset, estimate registration parameters to update the plurality of points with respect to said imaging dataset, compare each point with the corresponding value from said distance function, calculate a value an objective function depending on said estimated registration parameters, minimize said objective function by iteratively updating said registration parameters by conjugate-gradient-based function minimization until said registration parameters change by less than a predetermined tolerance.

11. The computer readable medium according to claim 10, further comprising a controlling code segment for controlling a catheter for continuous point acquisition.

12. A method for identifying an anatomical structure in a volume of interest, the method comprising acts of:

acquiring a plurality of points related to said anatomical structure in a continuous mode, and subsequently registering at least one of said points to a pre-procedurally or post-procedurally acquired imaging dataset of said structure;

wherein said registering comprises acts of:

processing said imaging dataset by segmentation, calculating 3D binary masks, calculating a distance function or other computed metric which reflects a distance to the surface of the structure of interest, aligning said continuously acquired plurality of points with said imaging dataset, estimating registration parameters to update the plurality of points with respect to said imaging dataset, comparing each point with the corresponding value from said distance function, calculating a value of an objective function depending on said estimated registration parameters, minimizing said objective function by iteratively updating said registration parameters by conjugate-gradient-based function minimization until said registration parameters change by less than a predetermined tolerance.

* * * * *